UNITED STATES PATENT OFFICE 2,032,826

TREATMENT OF OIL WELLS

Henry A. Ambrose and Abraham J. Teplitz, Pittsburgh, Pa., assignors to Gulf Research & Development Corporation, Wilmington, Del., a corporation of Delaware No Drawing. Application January 12, 1935, Serial No. 1,580

7 Claims. (Cl. 166—21)

This invention relates to treatment of oil wells; and it comprises a method of shutting off water from oil wells penetrating oil bearing and water bearing formations wherein any water standing in the well is removed and there is injected into the well and surrounding formations a solution in a solvent freely miscible with water, of a water insoluble, oil soluble, plastic body of a more or less waxy and crystalline character, the solution penetrating the water formations and the plastic substance being deposited in the pores of the water formation upon allowing the well to flow; all as more fully hereinafter set forth and as claimed.

Oil wells often penetrate water bearing strata adjacent oil bearing strata and delivering water into the well. It is undesirable for a well to deliver water along with oil and it is a desideratum in the art to shut off the water. Methods have been proposed and have come into use for locally shutting off all flows into a well, these involving cementing, encasement, etc. But such methods are non-selective; they reduce the oil flow to the same extent as the water flow. And in any case, sealing at the well face has the disadvantage that the differential pressure is high, tending to burst the seal.

According to the invention, there is provided a method for shutting off local flows of water into a well without substantially or permanently affecting oil flow into the well. This is done by injecting into the well and formations a solution, in a solvent freely miscible with water, of a water insoluble, oil soluble, plastic substance of a crystalline waxy nature. The solutions are thin, which permits them to be forced far into the adjoining formations, where sealing is most effective. The pressure gradient is much lower at points in the formation than at the well face, and seals are much more effective at remote points. On release of pressure water tends to flow inward towards the well, mixing with and carrying off the solvent and leaving the plastic substance deposited in the pores and crevices of the water strata, plugging them effectively. The substance being more or less soluble in oil, any accidental deposit of the substance in the oil strata is flushed out during the subsequent production of the well. But the plastic precipitated in the water formations is of such nature that it is not dislodged and water pressure in the formation merely tends to seal the pores tighter.

As a rule, any water or brine standing in the well is removed before the treatment described, to prevent premature deposition of the substance.

The substances most useful in the invention are plastics, insoluble in water and more or less soluble in oil, and of a generally waxy, crystalline nature. The crystal structure can be relatively large or it can be small. But strictly amorphous materials are not so useful. The solvent used in conjunction with the plastic substance depends partly on the nature of the substance. Acetone and the lower alcohols are the most convenient and are cheap.

Commercial stearic acid works well. This substance is a more or less waxy material, of crystalline structure. It can readily be dissolved in 95 per cent ethyl alcohol to form a thin, mobile solution, which penetrates even the finest pores of the formation. Such solution, on being left in the moist formation, takes up water and deposits out the stearic acid as a plastic deposit, tenaciously engaging the interstices and crevices and resisting dislodgment even under high formation pressures. Another good and cheap material is naphthalene, which can be dissolved in ethyl or other alcohols. Ordinarily 95 per cent ethyl alcohol dissolves 13.4 pounds naphthalene per hundred pounds alcohol at 30° C. to form a thin, stable solution which can be readily pumped, piped and handled and which penetrates freely into the formations. In each case the precipitated deposits are insoluble in water but are soluble enough in oil to prevent the possibility of any permanent plugging of the oil formations. They do not tend to gelatinize in oil.

Paraffin waxes can also be used and have the advantage that they are cheap and plentiful in oil producing regions. The wax need not be purified and it may be of the micro-crystalline type, including so-called slack wax (crude pressable wax) or of the higher melting micro-crystalline type: the unpressable waxes. These can be dissolved in acetone or other suitable solvent miscible with water. The solubility of hard crystalline paraffin in ordinarily more or less moist acetone is not very great, but by specially treating the acetone and using special grades of paraffin a higher solid content may be obtained. A crude, dry grade of acetone containing higher ketones is most useful. With a higher solid content in the liquid, the solution becomes applicable for the present purposes. These waxes are freely miscible with oil. The deposit formed on removal of the solvent from these wax solutions has excellent characteristics for the present purposes. Other natural waxes can be used.

Other substances of generally waxy and crystalline character are equally useful, the above examples being given by way of illustration. Substances which form a gel or a solid of any sort with oil are undesirable, because this results in plugging the oil formation to a greater or less degree. The precipitated substance should be miscible with oil. This does not require that it should be freely or quickly soluble, but it should be capable of being flushed away in a reasonable time by the oil.

The crystalline, waxy structure is important. With crystalline materials of the type described, even when the crystalline structure is quite small and the crystals are quite plastic rather than rigid, as in petrolatum type waxes, the crystalline structure makes for better adhesion of the precipitated substance in the minute pores and crevices of the water formation. Much better plugging is obtained than with strictly amorphous materials. Moreover, using crystalline substances, the crystals tend to build up and grow into a compact deposit, whereas amorphous materials under the conditions in a well bottom may tend to form a slime or a loose aggregation, much less effective for the present purposes than a crystal growth.

In a specific example of the invention applied to selectively shutting off water in an oil well penetrating adjacent oil and water sands, water standing in the well is bailed out and there is introduced into the well under pressure a batch of 10,000 pounds 95 per cent ethyl alcohol containing dissolved therein 200 pounds crude commercial naphthalene. The solution is thin and mobile and can be readily pumped by ordinary equipment. High pressure is applied, to drive the solution far into the water formation, where sealing is most effective. Pressure is maintained for a while and then released. The oil flow is substantially unaffected, while the water flow is substantially stopped. The plugging effect is permanent.

In another example of a specific embodiment of the invention, an oil well penetrating water and oil formations is treated for shutting off the water. A batch of 200 pounds of crude stearic acid in 10,000 pounds 95 per cent ethyl alcohol is pumped into the well under high pressure. After a while pressure is released and the water flow is found to be greatly reduced, while the oil flow is unaffected.

In a third example, a batch of 20 pounds crude paraffin wax of melting point 150° F. in 10,000 pounds acetone is introduced in the manner described into a well producing oil and water. The water flow is selectively stopped.

The treating solutions described are neutral and require no precautions against corrosion of metallic parts. They may be pumped and handled with ordinary equipment and they are stable; that is, there is no tendency toward premature precipitation. The materials are cheap and readily obtainable.

What we claim is:

1. The method of selectively shutting off water in an oil well penetrating oil and water bearing formations which comprises filling the interstices of the water bearing formation by forcing thereinto under high pressure a solution comprising a water insoluble, oil soluble plastic substance of a waxy and crystalline character and a solvent freely miscible with water, the said substance depositing out in the water bearing formation and the solvent mixing with the water.

2. The method of claim 1 wherein the plastic substance is a hydrocarbon wax.

3. The method of claim 1 wherein the plastic is stearic acid.

4. The method of claim 1 wherein the plastic substance is naphthalene.

5. The method of claim 1 wherein the liquid is an alcohol.

6. The method of claim 1 wherein the liquid is acetone.

7. The method of selectively shutting off water in an oil well penetrating oil and water bearing formations which comprises removing from the well any water standing therein, and then filling the interstices of the water bearing formation by forcing thereinto under high pressure a solution comprising a water insoluble, oil soluble plastic substance of a waxy and crystalline character and a solvent freely miscible with water, the solution being inert to oil and of such character as not to form sealing masses with oil, the said substance depositing out in the water bearing formation and the solvent mixing with the water.

HENRY A. AMBROSE.
ABRAHAM J. TEPLITZ.